US012693790B2

(12) United States Patent
Mulholland et al.

(10) Patent No.: US 12,693,790 B2
(45) Date of Patent: Jul. 28, 2026

(54) MITIGATING SEISMIC EVENTS VIA HIGHLY AVAILABLE VOLUMES

(71) Applicant: INTERNATIONAL BUSINESS MACHINES CORPORATION, Armonk, NY (US)

(72) Inventors: Miles Mulholland, Eastleigh (GB); Mark Keith Elliott, Hampshire (GB); Henry Bishop, Southampton (GB); Alastair Cooper, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 18/326,033

(22) Filed: May 31, 2023

(65) Prior Publication Data

US 2024/0402913 A1     Dec. 5, 2024

(51) Int. Cl.
*G06F 3/06*      (2006.01)
*G06F 11/14*     (2026.01)
(Continued)

(52) U.S. Cl.
CPC .......... *G06F 3/0619* (2013.01); *G06F 3/0647* (2013.01); *G06F 3/0683* (2013.01); (Continued)

(58) Field of Classification Search
CPC .... G06F 3/0619; G06F 3/0647; G06F 3/0683; G06F 11/1402; G06F 21/1082; G06F 3/0653; H04L 63/1433; H04Q 2213/13565
See application file for complete search history.

(56) References Cited

U.S. PATENT DOCUMENTS

| | | |
|---|---|---|
| 10,680,932 B1 | 6/2020 | Colgrove |
| 10,747,606 B1 | 8/2020 | Shemer |

(Continued)

OTHER PUBLICATIONS

Nakivo Team, "Thick and Thin Provisioning: What Is the Difference?", Jan. 29, 2018 https://www.nakivo.com/blog/thick-and-thin-provisioning-difference/ (Year: 2018).*

(Continued)

*Primary Examiner* — Nanci N Wong
(74) *Attorney, Agent, or Firm* — Robert D. Bean

(57) ABSTRACT

According to one embodiment, a method, computer system, and computer program product for mitigating vibration damage to a distributed storage system is provided. The present invention may include classifying at least two of the drives comprising the distributed storage system as vulnerable and not vulnerable, respectively, and responsive to detecting that a site associated with the distributed storage system is at risk of a vibration event, turning off the vulnerable drives at the site; creating a thin mitigation layer comprising thin-provisioned volumes associated with standard volumes comprising the vulnerable drives; routing read IO addressed to the standard volumes instead to associated partner volumes; routing write IO addressed to the standard volumes instead to the thin-provisioned volumes; and responsive to determining that the site is no longer at risk of a vibration event, turning on the vulnerable drives and copying states from the thin-provisioned volumes to the standard volumes.

17 Claims, 4 Drawing Sheets

(51) Int. Cl.
   *G06F 21/10*       (2013.01)
   *H04L 9/40*       (2022.01)

(52) U.S. Cl.
   CPC ...... *G06F 11/1402* (2013.01); *G06F 21/1082*
       (2023.08); *H04L 63/1433* (2013.01); *H04Q*
                                       *2213/13565* (2013.01)

(56)                References Cited

U.S. PATENT DOCUMENTS

| | | | | |
|---|---|---|---|---|
| 2005/0243609 | A1* | 11/2005 | Yang | G06F 3/0617 |
| | | | | 365/189.05 |
| 2006/0005074 | A1* | 1/2006 | Yanai | G06F 3/0619 |
| | | | | 714/6.32 |
| 2007/0255766 | A1* | 11/2007 | Di Giglio | G06F 11/2076 |
| | | | | 714/E11.107 |
| 2011/0191563 | A1* | 8/2011 | Acedo | G06F 3/0605 |
| | | | | 711/170 |
| 2014/0112638 | A1* | 4/2014 | Nguyen | H04N 5/765 |
| | | | | 386/231 |
| 2015/0293719 | A1* | 10/2015 | Luo | G06F 3/065 |
| | | | | 711/170 |
| 2015/0331637 | A1* | 11/2015 | Aguilar | G06F 3/0619 |
| | | | | 711/103 |
| 2016/0048435 | A1 | 2/2016 | Blea | |
| 2019/0391740 | A1 | 12/2019 | Cheng | |
| 2021/0034992 | A1 | 2/2021 | Mukeri | |
| 2022/0116454 | A1* | 4/2022 | Aharoni | G06F 3/067 |
| 2022/0164475 | A1* | 5/2022 | Barday | H04L 63/1433 |
| 2022/0300529 | A1 | 9/2022 | Zhou | |
| 2024/0281732 | A1* | 8/2024 | Ali-Saleh | G06Q 10/0635 |

OTHER PUBLICATIONS

Mangesh Shirke, "Demystifying Asymmetric Logical Unit Access with IBM FlashSystem", IBM, Apr. 19, 2021 https://community.ibm.com/community/user/storage/blogs/mangesh-shirke1/2021/04/19/demystifying-asymmetric-logical-unit-access-with-i (Year: 2021).*
Asymmetric SCSI behavior (letter from Ken Moe on Mar. 21, 2001) (Year: 2001).*

\* cited by examiner

100

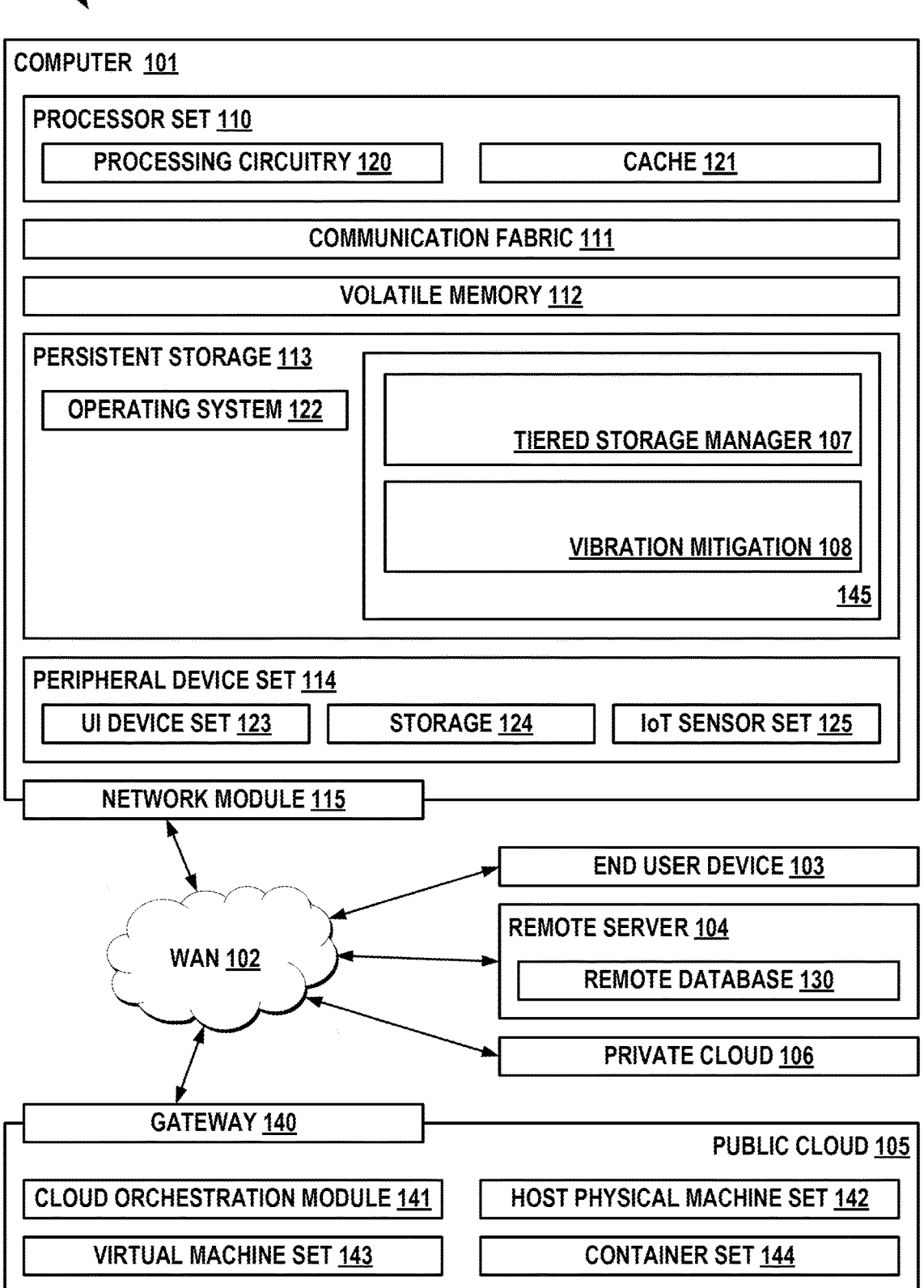

COMPUTER 101

PROCESSOR SET 110

PROCESSING CIRCUITRY 120                    CACHE 121

COMMUNICATION FABRIC 111

VOLATILE MEMORY 112

PERSISTENT STORAGE 113

OPERATING SYSTEM 122

TIERED STORAGE MANAGER 107

VIBRATION MITIGATION 108

145

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

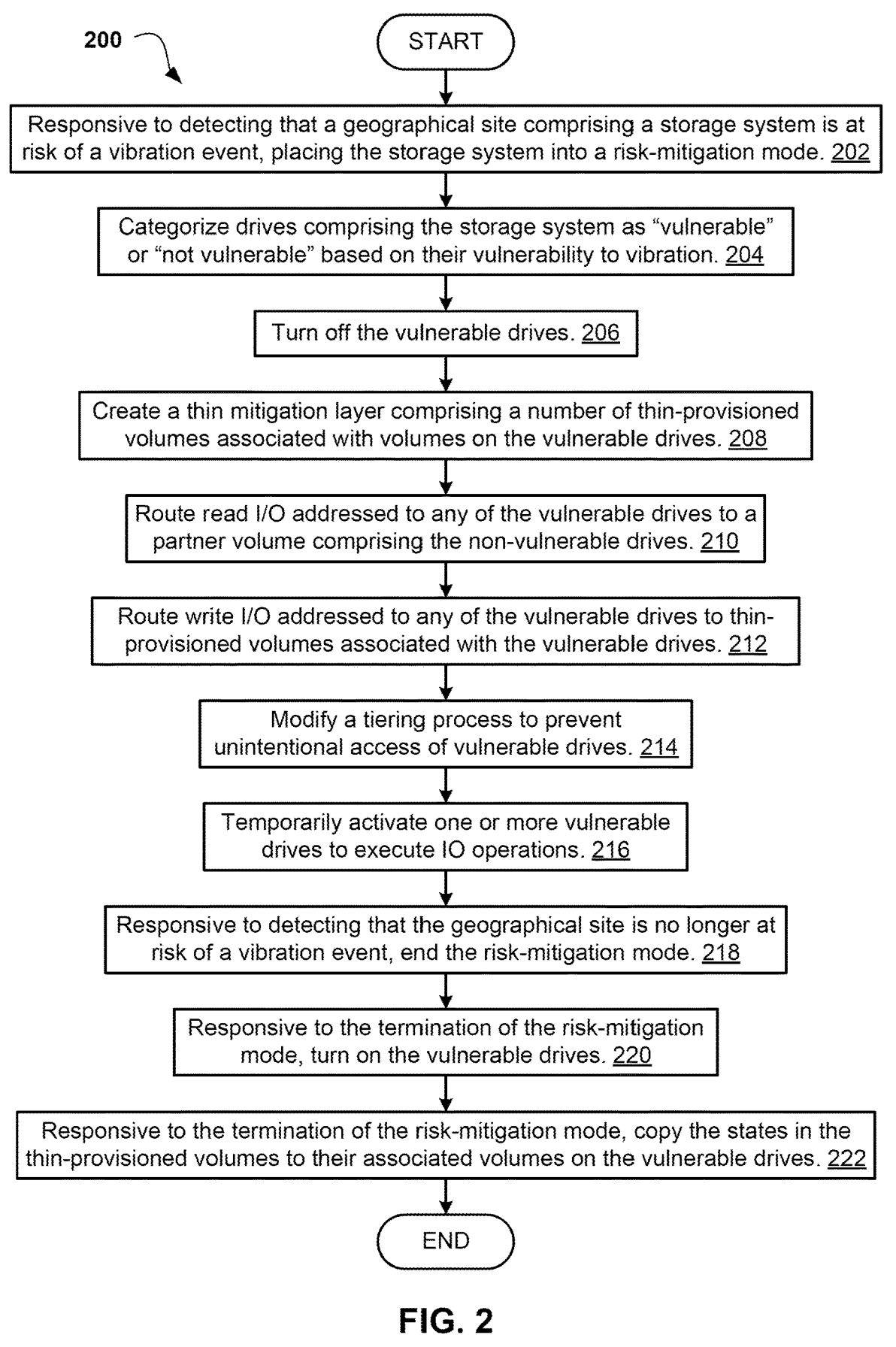

START

Responsive to detecting that a geographical site comprising a storage system is at risk of a vibration event, placing the storage system into a risk-mitigation mode. 202

Categorize drives comprising the storage system as "vulnerable" or "not vulnerable" based on their vulnerability to vibration. 204

Turn off the vulnerable drives. 206

Create a thin mitigation layer comprising a number of thin-provisioned volumes associated with volumes on the vulnerable drives. 208

Route read I/O addressed to any of the vulnerable drives to a partner volume comprising the non-vulnerable drives. 210

Route write I/O addressed to any of the vulnerable drives to thin-provisioned volumes associated with the vulnerable drives. 212

Modify a tiering process to prevent unintentional access of vulnerable drives. 214

Temporarily activate one or more vulnerable drives to execute IO operations. 216

Responsive to detecting that the geographical site is no longer at risk of a vibration event, end the risk-mitigation mode. 218

Responsive to the termination of the risk-mitigation mode, turn on the vulnerable drives. 220

Responsive to the termination of the risk-mitigation mode, copy the states in the thin-provisioned volumes to their associated volumes on the vulnerable drives. 222

END

FIG. 2

MITIGATING SEISMIC EVENTS VIA HIGHLY AVAILABLE VOLUMES

BACKGROUND

The present invention relates, generally, to the field of computing, and more particularly to disaster recovery.

The technological field of disaster recovery is concerned with the process of restoring an organization's information technology infrastructure, data, and applications after a disruptive event such as a natural disaster, cyberattack, or system failure. The goal of disaster recovery is to minimize downtime and data loss and ensure business continuity. Disaster recovery typically involves a combination of backup and recovery procedures, data replication, and contingency planning. Disaster recovery may rely heavily on pre-emptive risk mitigation measures such as backing up critical data and applications and storing them in an offsite location or the cloud, so that they can be quickly restored in the event of a disaster, and/or by duplicating critical data and applications to multiple locations, such as a remote data center or the cloud. This helps ensure that there is a redundant copy of data and applications in case the primary site is unavailable. Overall, disaster recovery is a critical component of any organization's IT strategy, as it helps ensure that critical systems and data are protected and can be quickly restored in the event of a disaster. As organizations and society in general becomes increasingly reliant on progressively more complex IT infrastructure, finding ways to mitigate the effects of disasters on such infrastructure becomes ever more important.

SUMMARY

According to one embodiment, a method, computer system, and computer program product for mitigating vibration damage to a distributed storage system is provided. The present invention may include classifying at least two of the drives comprising the distributed storage system as vulnerable and not vulnerable, respectively, and responsive to detecting that a site associated with the distributed storage system is at risk of a vibration event, turning off the vulnerable drives at the site; creating a thin mitigation layer comprising thin-provisioned volumes associated with standard volumes comprising the vulnerable drives; routing read IO addressed to the standard volumes instead to associated partner volumes; routing write IO addressed to the standard volumes instead to the thin-provisioned volumes; and responsive to determining that the site is no longer at risk of a vibration event, turning on the vulnerable drives and copying states from the thin-provisioned volumes to the standard volumes.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

FIG. 2 is an operational flowchart illustrating a vibration mitigation process according to at least one embodiment;

DETAILED DESCRIPTION

Figure 3:
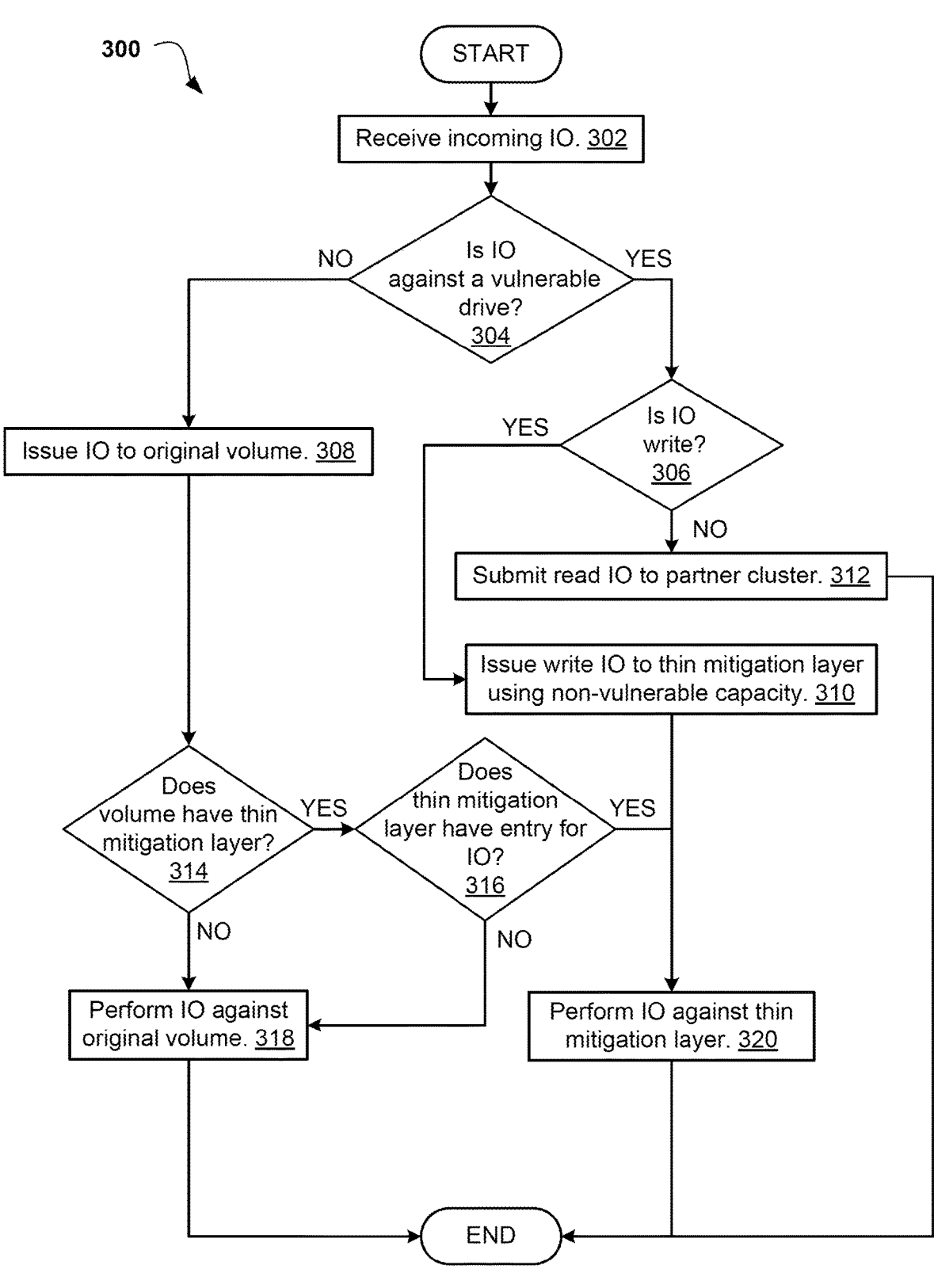
FIG. 3 is an operational flowchart illustrating a method of routing IO operations to non-vulnerable capacity as part of a vibration mitigation process, according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to disaster recovery. The following described exemplary embodiments provide a system, method, and program product for, among other things, identifying storage hardware in a storage system that is vulnerable to vibration, and, upon detecting a vibration event, shutting down vulnerable drives and moving operations to non-vulnerable drives until the vibration event has concluded.

As previously described, the technological field of disaster recovery is concerned with the process of restoring an organization's information technology infrastructure, data, and applications after a disruptive event such as a natural disaster, cyberattack, or system failure. Among disasters, vibration events, such as natural earthquakes and man-made seismic disturbances, are particularly effective at ruining hard drives. Many traditional disaster recovery methods, including failover methods such as RAID arrays, are little defense against substantial vibration events where all failover hardware is located in the same geographical location; in such scenarios, the whole array may be subject to vibrations which are not survivable, destroying both the primary and backup data locations through loss of all vulnerable hardware. Such failures result not only in data loss, but also hardware loss, resulting in steep drive replacement costs and extended system downtime during the maintenance windows necessary to repair the system. The danger is exacerbated by the propensity of datacenters to be located within earthquake risk zones, such as California and Japan.

Hard disk drives (HDDs) are particularly vulnerable to vibration damage, as vibrations may cause the read-write head to become misaligned or even crash into the spinning disk, causing data loss or damage to the drive. Solid state drives (SSDs) have no moving parts, and are therefore less vulnerable to shock or vibration, but may still be damaged by severe vibrations, particularly if they are not securely mounted. However, there are ways to mitigate damage even from significant vibration events; drives which are not operational are less vulnerable to damage from vibration. In the case of mechanical hard drives, this is because the drive heads are placed in safe positions away from disk platters when not in operation. Some mechanical drive makes and models are more vulnerable to vibration-related failure than others, even within the broad category of mechanical hard drives. Accordingly, vibration damage may be mitigated by stopping reads and writes to a drive if a system detects a seismic event pre-shock.

However, while shutting down vulnerable drives may reduce or prevent damage to the drives, a storage system employing such a method would not be able to service read/write requests for the duration of the drive shutdowns. In the case of storage systems employing a replication relationship, such as a RAID, the relationship between replicated nodes desynchronises, potentially reducing redundancy below legally and/or otherwise acceptable levels.

As such, it may be advantageous to, among other things, implement a system that comprises two separate storage clusters split over two or more geographical sites; such a system may, responsive to detecting that a geographical site is likely to be subject to a vibration event, turning off all drives at that site that are vulnerable to vibration, and routing read/write traffic to partner volumes of the deactivated devices which are located on geographic sites that are not subject to the vibration event. Therefore, the present embodiment has the capacity to improve the technical field of disaster recovery by identifying and shutting down vulnerable drives during a vibration event to prevent data loss and damage to hardware while simultaneously maintaining the data, redundancy, and continued access to and operation of the system, thereby enabling storage systems to survive damage while providing uninterrupted service to users. Furthermore, the use of a thin mitigation layer allows a local site to avoid the overheads of resynchronization by shortening resynchronization times in the event of a local failure, with less bandwidth usage compared to, for example, a basic distributed RAID-10 geometry, which would require a more extensive resynchronization process. Additionally, in a system employing a thin mitigation layer, data replication occurs at the volume level, and therefore does not require multiple sites to have mirrored drive/RAID configurations.

According to embodiments, the invention is a system and method of categorizing drives based on their vulnerability to vibration, shutting off vulnerable drives, and routing read and write operations to non-vulnerable drives using a thin mitigation layer responsive to detecting that a geographic site is likely to be subject to a vibration event; and turning on vulnerable drives and copying entries from the thin provisioning layer to the vulnerable drives responsive to detecting that the vibration event is concluded.

According to embodiments, the invention is a vibration mitigation system, which may be a distributed storage system comprising two separate storage clusters split over two or more sites, which may be geographical locations where physical storage hardware is located. The sites may be located far enough apart that a vibrational event of any at one site would not damage hardware at another site, which could be tens to hundreds of miles depending on the magnitude of the vibrational event. The vibration mitigation may comprise an active-active replicated environment including one or more highly available volumes. Highly available volumes may be storage volumes or disks that replicate or distribute data across multiple physical disks or nodes, allowing for continued operation even if individual components fail. A highly available volume may comprise at least two volume-copies, with at least one copy at each site, a system-local volume copy and a remote volume copy. These volumes are often implemented using redundant and fault-tolerant storage technologies such as RAID (redundant array of independent disks) or Hyperswap® (Hyperswap® and all Hyperswap®-based trademarks and logos are trademarks or registered trademarks of International Business Machines Corporation and/or its affiliates). The vibration mitigation system may exhibit asymmetry between where read IOs are performed and where write IOs must be performed; more specifically, while all partnered volumes eventually receive a given incoming write IO, either through the original write, or through the data being replicated to the partner volume from the volume that originally received the write IO, read IOs are typically processed on the site that receives the read IO: this approach minimizes latency. For any given standard volume stored in a drive located at a site, the system may comprise at least one partner volume stored on a drive that is located at a different site, such that no standard volume may located at the same site as its partner. A partner volume may be a copy of the standard volume with which it is associated, comprising at least the same data; the data may be mirrored, replicated, et cetera between the standard and partner volumes. In embodiments, a standard volume may be partnered with more than one other volume, each at a different site. The standard volumes and partner volumes may comprise highly available volumes.

According to embodiments, the invention utilizes an Asymmetric Logical Unit Access (ALUA) feature within the SCSI standard, or equivalents, such as the Asymmetric Namespace Access (ANA) of the NVME protocol. ALUA and equivalent features allow a storage controller to flag paths to volumes described by SCSI or NVME or other protocols as having different priorities of access, thereby directing where write IO is routed to. This feature may effectively reduce read IOs being sent to the cluster to begin with by routing them to other clusters, while mitigating against bottlenecks such as no cache, long distance link, et cetera. A host multipath controller will receive these details and, dependent on the implementation, give preference to flagged paths. The system may employ this technology to direct host IOs to specific nodes, e.g., those owning a given volume, thus able to access nodes with minimal lock-messaging overheads.

In embodiments of the invention, the thin mitigation layer may comprise one or more logical volumes, referred to herein as thin provisioned volumes, associated with standard volumes comprising the vulnerable drives, but which are instantiated and maintained on not vulnerable drives; the system may track the actual usage of the virtual disks of the thin mitigation layer and allocate physical storage as needed to ensure that the virtual disks have enough space to store data. In some embodiments, the thin mitigation layer may operate as follows:

When entering risk-mitigation mode, write IOs to a standard volume are directed, by the system, to a thin provisioned volume of the thin mitigation layer which is associated with that standard volume, if the write IO would otherwise go to capacity which is considered vulnerable.

This thin mitigation layer itself is based on capacity which is not vulnerable to vibration.

If read IOs need to be performed, the system first accesses the thin provisioned volume to determine whether write IOs exist for the associated volume. If no entry is found in the thin provisioned volume, the system performs a read against the associated standard volume.

When exiting risk-mitigation mode, the system may slowly flatten the thin mitigation layer by copying from the thin provisioned volumes to their associated standard volumes and then removing the copied entry from the thin provisioned volume. Once all of the thin provisioned volumes have been emptied, the thin mitigation layer may be terminated.

In some embodiments of the invention, for example where the system employs a RAID virtual storage configuration, the system may ensure safer access to vulnerable capacity during risk-mitigation mode via modifications to the RAID: if the system needs to perform a read or a write to a standard volume that is part of a vulnerable range, the system may stagger the execution of the IO over the drives such that only one drive is active at any given time. The system may increase the number of drives which are active at any given time dependent on the level of redundancy present in the RAID array. This approach may be necessary to support tiering if the system must operate in risk-mitigation mode for an extended duration.

In some embodiments, the system may apply the risk-mitigation mode to better survive an event where a local array has been subject to medium errors or a whole array has failed. In these circumstances, entering mitigation mode such that new IOs are sent to non-vulnerable capacity allows the relationship to be maintained as if the system were undamaged. The system can then wait for repair of the array, and/or may resynchronize the affected ranges without an overall loss of synchronization of the relationship. This mechanism may avoid a lengthier period where the relationship is desynchronized, and as a result allows for better failure characteristics. Behaving in this fashion effectively treats the two sites almost like a distributed RAID-10 array: the system can mitigate losses on either site so long as the partner site has a copy of the data without desynchronizing, whilst attempting to repair the underlying storage either through a limited resynchronization or through whatever rebuild mechanism is available.

In some embodiments, such as where IOs are still being serviced by the vulnerable drives, for example where the system is operating in a mode where singular vulnerable drives are allowed to operate in a staggered fashion, the system may make a modification to the tiering process to avoid accessing vulnerable capacity. If a range on a disk changes heat, and would be relocated under the tiering paradigm, the system may avoid accessing vulnerable capacity by reading from the remote site as follows:

Detect an extent which is going to be migrated to another tier;

Look up the associated system-local volume copy to identify the virtual range associated with the extent; and If local capacity on non-vulnerable extents exists via a mirrored copy, copy the data from this local capacity to the new extent; otherwise, the system requests the partner cluster to send the associated system-local volume copy's data, rather than reading from the vulnerable ranges.

In some embodiments of the invention, for example where the system identifies different levels of vulnerability among drives that are vulnerable to vibration, the system may make additional modifications to tiering such that active-active copy technologies or mirrored disks do not use drives which are particularly vibration sensitive for the same backend ranges. This requires the system to ensure that allocations and migrations consider the mirrored/active-active copy technology volume's makeup by determining whether the underlying volumes comprise vulnerable or non-vulnerable capacity and opt against allocating vulnerable capacity if a virtual address range does not have a less-vulnerable counterpart already. In the event of a failure, it would be necessary to rebuild from both mirrors under such an approach.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product for identifying storage hardware in a storage system that is vulnerable to vibration, and, upon detecting a vibration event, shutting down vulnerable drives and moving operations to non-vulnerable drives until the vibration event has concluded.

Referring now to FIG. 1, computing environment 100 contains an example of an environment for the execution of at least some of the computer code involved in performing the inventive methods, such as code block 145, which may comprise tiered storage manager program 107 and vibration mitigation program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. In some embodiments, peripheral device set 114 may include one or more seismic sensors designed to detect vibrations in the earth, such as velocity sensors, seismometers, seismographs, accelerometers, et cetera.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the tiered storage manager 107 may be a software application that manages data storage across multiple tiers of storage devices or media, such as hard disk drives, solid-state drives, and tape drives. The tiered storage manager 107 is responsible for managing the movement of data between the different tiers of storage based on policies and rules set by the system administrator or user. The tiered storage manager 107 constantly monitors the access patterns and usage of data and automatically moves data between different tiers of storage to optimize performance and cost. In embodiments of the invention, the tiered storage manager 107 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, tiered storage manager 107 may be distributed in its operation over any number or combination of the aforementioned devices. The tiered storage manager 107 may be in communication with, a functionality, module, or subroutine of, or otherwise integrated with and/or interoperable with vibration mitigation program 108. In embodiments of the invention, for example where the vibration mitigation system 400 does not comprise a tiered storage environment, tiered storage manager 107 may not be present.

According to the present embodiment, the vibration mitigation program 108 may be a program capable of identifying storage hardware in a storage system that is vulnerable to vibration, and, upon detecting a vibration event, shutting down vulnerable drives and moving operations to non-vulnerable drives until the vibration event has concluded. The vibration mitigation program 108 may, when executed, cause the computing environment 100 to carry out a vibration mitigation process 200. The vibration mitigation process 200 may be explained in further detail below with respect to FIG. 2. In embodiments of the invention, the vibration mitigation program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, vibration mitigation program 108 may be distributed in its operation over any number or combination of the aforementioned devices. The vibration mitigation program 108 may be in communication with and/or configured to interoperate with the tiered storage manager 107.

Referring now to FIG. 2, an operational flowchart illustrating a vibration mitigation process 200 is depicted according to at least one embodiment. At 202, the vibration mitigation program 108 may, responsive to detecting that a geographical site comprising a vibration mitigation system is at risk of a vibration event, placing the vibration mitigation system into a risk-mitigation mode. In some embodiments of the invention, for example where the system comprises or is in communication with one or more seismic sensors, the vibration mitigation program 108 may record and/or analyze data from seismic sensors located at or near the sites associated with the vibration mitigation system, to identify seismic activity that exceeds the threshold of magnitude that indicates the onset or presence of a vibrational event. A vibrational event may be any seismic disturbance capable of causing damage to storage hardware. Additionally or alternatively, the vibration mitigation program 108 may monitor remote sensors gathering geological data, news or data feeds reporting on geological or man-made activity, et cetera to identify remotely occurring seismic events and extrapolate the time at which such seismic activity will arrive at a site associated with the vibration mitigation system, and the magnitude of such seismic activity at the time it arrives; if the predicted magnitude of such seismic activity exceeds the threshold of magnitude, the vibration mitigation program 108 may predict a vibrational event at the predicted time. Based on predicting a vibrational event, the vibration mitigation program 108 may activate a risk-mitigation mode by toggling a binary state indicator and issuing one or more commands to the vibration mitigation system and/or tiering system 107 to indicate the state change and initiate the operations and processes that are to occur under the risk-mitigation paradigm.

In some embodiments, the vibration mitigation program 108 may initiate a risk-mitigation mode when no vibrational event has been detected; for example, where substantial portions of the vibration mitigation system have failed, and the vibration mitigation system requires additional redundancy to maintain ordinary operation. The vibration mitigation program 108 may initiate risk-mitigation mode automatically responsive to identifying hardware failures exceeding a severity threshold, or in response to a command by an external software agent/process or human user.

At 204, the vibration mitigation program 108 may categorize drives comprising the vibration mitigation system as "vulnerable" or "not vulnerable" based on their vulnerability to vibration. During or prior to activation of the risk-mitigation mode, the vibration mitigation program 108 may assess the types of drives comprising the vibration mitigation system to determine an initial determination of vulnerability; in some embodiments, the vibration mitigation program 108 may simply engage in a binary classification, marking HDDs as vulnerable, and SSDs as not vulnerable. In some embodiments, the vibration mitigation program 108 may assess each drive's particular vulnerability to vibration based on its technical specifications, whether the drive or class of drive has failed in the past due to vibration as determined by drive failure analysis, a vendor-assigned vibration vulnerability rating, the speed or track density of a given mechanical drive as faster and/or larger drives may tend to be more sensitive to vibration, et cetera, and assign a vulnerability score to every drive. Drives with a vulnerability score below a vulnerability threshold may be considered vulnerable drives, while drives meeting or exceeding the vulnerability threshold may be considered not vulnerable drives. In some embodiments, if the vulnerability score of a drive falls below a second, lower threshold than the vulnerability threshold, which may represent particular or extreme vulnerability to vibration, may be classified as particularly vulnerable. After activation of the risk-management mode, the vibration mitigation program 108 may assess the geographic location of each drive and make a secondary determination of vulnerability. Here, the vibration mitigation program 108 may determine whether a drive is at a site where a vibrational event has been observed or predicted; if the drive is at a site where no vibrational event has been observed or predicted, that drive may be classified as not vulnerable, whether or not it was classified as vulnerable or not vulnerable in the initial vulnerability determination. If the drive is located at a site where the vibrational event has been observed or predicted, the vibration mitigation program 108 may consult the initial vulnerability determination; drives that were initially classified as vulnerable or not vulnerable retain the same classification in the final vulnerability determination. The storage space provided by vulnerable drives may collectively be referred to as vulnerable capacity, and the storage space provided by non-vulnerable drives may be collectively referred to as non-vulnerable capacity. In some embodiments, volumes may be spread over both vulnerable and non-vulnerable capacity.

In embodiments, the vibration mitigation program 108 may maintain drive vulnerability classifications for the duration of the risk-mitigation mode; the vibration mitigation program 108 may perform the initial classification once at intervals, whenever a new device is added or subtracted from the system, and/or whenever the vibration mitigation system enters risk-mitigation mode. The vibration mitigation program 108 may perform the final classification anew whenever the system enters risk-mitigation mode.

At 206, the vibration mitigation program 108 may turn off the vulnerable drives. Here, vibration mitigation program 108 may shut down and suspend operation of all drives classified as vulnerable. In some embodiments, the vibration mitigation program 108 may, for HDDs, operate the read heads to retract to safe positions away from the disk.

At 208, the vibration mitigation program 108 may create a thin mitigation layer comprising a number of thin-provisioned volumes associated with volumes that have any amount of capacity on a vulnerable drive. Here, the vibration mitigation program 108 may instantiate a thin mitigation layer by allocating storage space from one or more non-vulnerable drives. The thin mitigation layer may be a logical storage abstraction comprising one or more thin provisioned volumes corresponding to volumes on vulnerable drives; the thin provisioned volumes may each comprise an additive layer associated with a standard volume located on a vulnerable drive but located on non-vulnerable capacity. Incoming write IOs addressed to the standard volume are instead routed to the thin-provisioned volume, where the write IOs are stored. By this method, the vulnerable original volume is untouched, but read IOs are recorded and may be consulted in the course of executing read IOs and may be folded into the original volume once the risk-mitigation mode concludes. The vibration mitigation system may track the actual usage of the thin provisioned volumes of the thin mitigation layer and allocate physical storage from the non-vulnerable capacity as needed to ensure that the thin provisioned volumes have enough space to store write data.

At 210, the vibration mitigation program 108 may route read I/O addressed to any of the vulnerable drives to a partner volume comprising the not vulnerable drives. Here, the vibration mitigation program 108 may first access the thin provisioned volume corresponding to the standard volume to which the read I/O was originally addressed to determine whether write IOs exist for the standard volume. If no entry is found in the thin provisioned volume, the system performs a read against the partner volume associated with the standard volume to which the read IO was originally addressed. If one or more write entries are found in the thin provisioned volume, the system performs a read against the thin provisioned volume. In some embodiments, the vibration mitigation program 108 may utilize an asymmetric logical unit access (ALUA) feature to identify which paths between a host IO and a specific node, for example a node owning a given volume, are considered optimal, and enable a host multipath controller to give preference to the optimized paths, facilitating routing between the read IO and its destination. The IO routing process may be discussed in further detail below with respect to FIG. 3.

At 212, the vibration mitigation program 108 may route write I/O addressed to any of the vulnerable drives to thin-provisioned volumes associated with the vulnerable drives. Here, the vibration mitigation program 108 performs the write operations on the thin-provisioned volumes corresponding to the standard volumes to which the write I/O was originally addressed, such that all write operations received during risk-mitigation mode are executed on the thin-provisioned volumes rather than the partner volumes. The vibration mitigation program 108 may utilize an asymmetric logical unit access (ALUA) feature to identify which paths between a host IO and a specific node, for example a node owning a given volume, are considered optimal, and enable a host multipath controller to give preference to the optimized paths, facilitating routing between a write IO and its destination. The IO routing process may be discussed in further detail below with respect to FIG. 3.

At 214, the vibration mitigation program 108 may modify a tiering process to prevent unintentional access of vulnerable drives. Here, the vibration mitigation system may comprise a tiered storage process, under which the data stored in the vibration mitigation system is divided into multiple tiers, with each tier representing a different level of performance, capacity, and cost. The higher the tier, the faster the access and the more expensive the storage media. The lower tiers have lower access speeds but are more cost-effective. The tiered storage manager 107 constantly monitors the access patterns and usage of data and automatically moves data between different tiers of storage to optimize performance and cost according to a set of pre-provided rules. This can result in data being migrated to vulnerable capacity. As such, in embodiments, the vibration mitigation program 108 may operate, instruct, or modify the tiered storage manager 107 to detect when an extent is going to be migrated to another tier; look up the system-local copy of the volume associated with that extent to identify the virtual range associated with the extent; and, if local capacity on non-vulnerable extents exists via a mirrored copy, copy the data from the local capacity to the new extent; otherwise, the vibration mitigation program 108 requests the partner volume to send the associated data of the system-local copy of the volume, rather than reading from ranges located on vulnerable drives.

In some embodiments, for example where vibration mitigation program 108 classifies one or more drives as particularly vulnerable, vibration mitigation program 108 may instruct, operate, or modify the tiered storage manager 107 to prevent highly available volumes from using drives classified as particularly vulnerable for the same backend ranges. In performing an allocation or migration, vibration mitigation program 108 and/or tiered storage manager 107 may consider the makeup of any given highly available volume and avoid allocating particularly vulnerable capacity if a virtual address range does not have a less-vulnerable counterpart already.

At 216, the vibration mitigation program 108 may temporarily activate one or more vulnerable drives to execute IO operations. In some embodiments, for example where the vibration mitigation system must operate in risk-mitigation mode for extended periods of time, such as where the local array has been damaged by errors, array failures, damage, et cetera, and where the vibration mitigation program 108 cannot access remote clusters, it may become necessary to access vulnerable drives, for instance where a system employs a RAID storage configuration, or to migrate cold extents to vulnerable drives to free up valuable non-vulnerable capacity. If vibration mitigation program 108 needs to perform a read or a write to a standard volume that is part of a range within the vulnerable capacity, the vibration mitigation program 108 may stagger execution of the IO operations over the drives where they are to be carried out such that only one drive is active at any given time. In some embodiments, the vibration mitigation program 108 may increase the number of drives which are active at any given time depending on the level of redundancy present in the vibration mitigation system, such that at least one drive of redundancy is preserved at all times to avoid risking loss of data. In an example where an extent located on a set of vulnerable capacity has become hot, the vibration mitigation program 108 may check to see if the hot extent has an equivalent in a partner volume on non-vulnerable capacity; if it does, the vibration mitigation program 108 may read the extent from the partner volume and copy it to non-vulnerable capacity. However, if the extent has no equivalent in a partner volume on non-vulnerable capacity, the vibration mitigation program 108 may issue reads against the vulnerable capacity to retrieve the hot extent's equivalent from the standard volume; the vibration mitigation program 108 may stagger execution of the IO operations such that no more vulnerable drives are active at any given moment than redundancy allows for. For example, for arrays employing a RAID-5 configuration, the array would have a single drive worth of redundancy. Under such a configuration the vibration mitigation program 108 could have a single drive active at any given time and not risk loss of data but would have to perform accesses in a serialised fashion to preserve that one drive worth of redundancy. An array employing a RAID-6 configuration has a redundancy of 2, so vibration mitigation program 108 can have 2 drives active at a given time while preserving redundancy. For an array employing a RAID-10 configuration, vibration mitigation program 108 would be more or less unaffected by a vibration event at a site and may have all drives of one copy of the array active to perform a read.

At 218, the vibration mitigation program 108 may, responsive to detecting that the geographical site is no longer at risk of a vibration event, end the risk-mitigation mode. The vibration mitigation program 108 may record and/or analyze data from seismic sensors located at or near the sites associated with the vibration mitigation system and/or monitor remote sensors gathering geological data, news or data feeds reporting on geological or man-made activity, et cetera to track seismic activity that exceeds the threshold of magnitude. If the magnitude of detected seismic activity meets or falls below the threshold of magnitude and remains below the threshold of magnitude for a predetermined period of time, the vibration mitigation program 108 may end the risk-mitigation mode. Based on identifying the end of the vibrational event, the vibration mitigation program 108 may de-activate the risk-mitigation mode by toggling a binary state indicator and issuing one or more commands to the vibration mitigation system and/or tiering system 107 to resume ordinary operations. In some embodiments, rather than de-activate the risk mitigation mode in response to determining that a vibrational event has ended, the vibration mitigation program 108 may end the risk mitigation mode in response to receiving a command from a human user or software agent or process.

At 220, the vibration mitigation program 108 may, responsive to the termination of the risk-mitigation mode, turn on the vulnerable drives. Here, the vibration mitigation program 108 may restore power and operation to the previously shut down vulnerable drives.

At 222, the vibration mitigation program 108 may, responsive to the termination of the risk-mitigation mode, copy the states, or entries, in the thin-provisioned volumes to their associated volumes on the vulnerable drives. Here, the vibration mitigation program 108 may resynchronize standard volumes on vulnerable drives by copying the states, comprising all write operations that were executed during the risk-mitigation mode, to the standard volumes. Once the states for a standard volume have been copied from its thin-provisioned volume, the thin-provisioned volume may be deallocated; this process may be repeated for each thin-provisioned volume until everyone has been emptied into its corresponding standard volume, at which point the thin mitigation layer may terminate.

Referring now to FIG. 3, an operational flowchart illustrating a method of routing IO operations to non-vulnerable capacity 300 is depicted according to at least one embodiment. At 302, the vibration mitigation program 108 may receive incoming IO. IO may be a read operation or a write operation requesting or modifying information, respectively, within a particular drive.

At 304, the vibration mitigation program 108 determines whether the IO is against a vulnerable drive. The vibration mitigation program 108 may determine the extent to which the IO operation is addressed, lookup the volume and drive upon which the extent resides and cross-check the drive against a list of vulnerable drives. If the drive to which the IO is addressed is on the list of vulnerable drives, the vibration mitigation program 108 will determine the drive to be vulnerable. According to one implementation, if the vibration mitigation program 108 determines that the IO is against a vulnerable drive (step 304, "YES" branch), the vibration mitigation program 108 may continue to step 306 to determine if the IO is written. If the vibration mitigation program 108 determines that the IO is not against a vulnerable drive (step 304, "NO" branch), the vibration mitigation program 108 may continue to step 308 to issue the IO to the original volume.

At 306, the vibration mitigation program 108 determines whether the IO is written. The vibration mitigation program 108 may determine whether the IO comprises a read operation or a write operation. According to one implementation, if the vibration mitigation program 108 determines that the IO is a write operation (step 306, "YES" branch), the vibration mitigation program 108 may continue to step 310 to issue the write IO to the thin mitigation layer using non-vulnerable capacity. If the vibration mitigation program 108 determines that the IO is not a write operation, and is instead a read operation (step 306, "NO" branch), the vibration mitigation program 108 may continue to step 312 to submit the read IO to a partner cluster.

At 308, the vibration mitigation program 108 may issue the IO to the original volume. Here, the vibration mitigation program 108 may send a request to the vibration mitigation system to read or write data on the drive to which the IO operation was originally addressed. The storage device driver or controller may then translate the I/O request into the appropriate commands that can be executed by the storage device.

At 310, the vibration mitigation program 108 may issue the write IO to the thin mitigation layer using non-vulnerable capacity. Here, the vibration mitigation program 108 may send a request to the vibration mitigation system to write data to the thin provisioned volume within the thin mitigation layer that corresponds to the vulnerable drive to which the write IO was originally addressed. The storage device driver or controller may then translate the write request into the appropriate commands that can be executed by the storage device.

At 312, the vibration mitigation program 108 may submit the read IO to a partner cluster. Here, the vibration mitigation program 108 may send a request to the vibration mitigation system to read data on the volume or drive that is the partner of the volume on the vulnerable drive to which the IO operation was originally addressed. The partner volume or drive is a copy of the original drive or volume and may be mirrored or otherwise comprise the same data. The storage device driver or controller may then translate the I/O request into the appropriate commands that can be executed by the storage device.

At 314, the vibration mitigation program 108 determines whether the volume has a thin mitigation layer. As the purpose of the thin mitigation layer is to intercept write IOs addressed to vulnerable drives, a volume may only have an associated thin mitigation volume if it is located on a vulnerable drive. As such, the vibration mitigation program 108 may determine whether the thin mitigation layer comprises a thin-provisioned volume that corresponds to the original volume to which the IO operation was originally addressed by identifying whether the volume is located on a vulnerable drive. According to one implementation, if the vibration mitigation program 108 determines that the volume has a thin mitigation layer (step 314, "YES" branch), the vibration mitigation program 108 may continue to step 316 to determine whether the thin mitigation layer has an entry for IO. If the vibration mitigation program 108 determines that the volume does not have a thin mitigation layer (step 314, "NO" branch), the vibration mitigation program 108 may continue to step 318 to perform the IO against the original volume.

At 316, the vibration mitigation program 108 determines whether the thin mitigation layer has an entry for IO. The thin-provisioned volume may functionally operate as a tree structure with data; where one writes to the thin-provisioned volume, the vibration mitigation program 108 creates an entry in the tree which points to a location in the data range. The vibration mitigation program 108 may perform a lookup on the tree structure to determine if a data entry exists. According to one implementation, if the vibration mitigation program 108 determines that the thin mitigation layer has an entry for IO (step 316, "YES" branch), the vibration mitigation program 108 may continue to step 320 to perform IO against the thin mitigation layer. If the vibration mitigation program 108 determines that the thin mitigation layer does not have an entry for IO (step 316, "NO" branch), the vibration mitigation program 108 may continue to step 318 to perform the IO against the original volume.

At 318, the vibration mitigation program 108 may perform IO against the original volume. Here, the vibration mitigation program 108 executes the IO operation by reading or writing data to or from the original volume.

At 320, the vibration mitigation program 108 may perform IO against the thin mitigation layer. Here, the vibration mitigation program 108 executes the IO operation by reading or writing data to or from the thin-provisioned volume comprising the thin mitigation layer.

Figure 4:
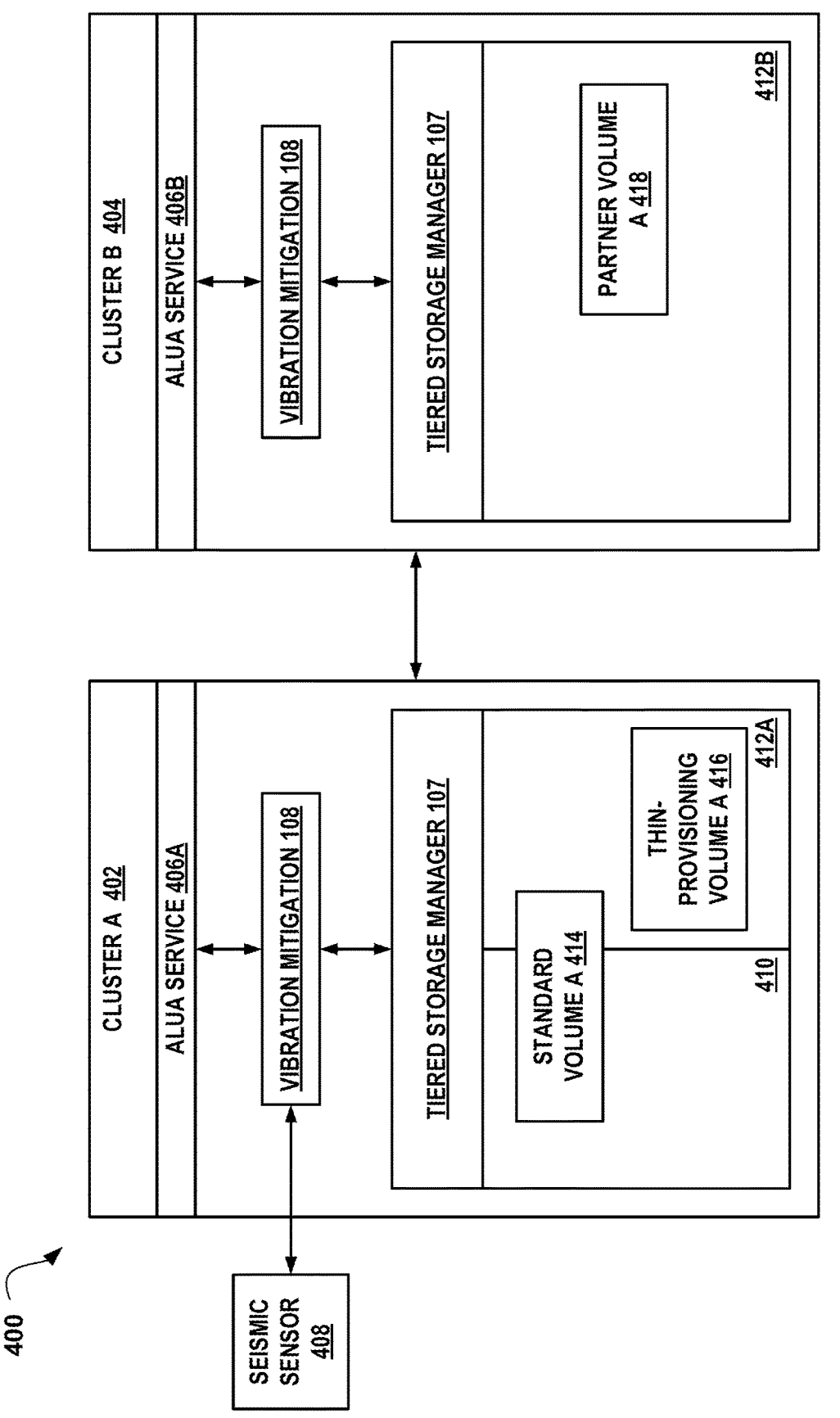
FIG. 4 illustrates an exemplary vibration mitigation system according to at least one embodiment.

Referring now to FIG. 4, the vibration mitigation system 400 comprises two storage clusters, cluster A 402 and cluster B 404. While vibration mitigation system 400 may comprise any number of storage clusters greater than two, only two are depicted here for the sake of brevity. Cluster A 402 and cluster B 404 both comprise an instance or module of the vibration mitigation program 108, which may be in communication with an ALUA service 406A,406B. The ALUA service 406A,406B may identify optimal paths between a host IO and a specific node and facilitate routing between the host IO and the specific node on those optimal paths. The vibration mitigation program 108 may additionally be connected to or in communication with a seismic sensor 408, and instances of tiered storage manager 107. On cluster A 402, tiered storage manager 107 manages the cluster's storage capacity, which comprises vulnerable capacity 410 and non-vulnerable capacity 412A. Standard volume A 414 is stored in cluster A 402, and some of its extents are located in the non-vulnerable capacity 412A while the majority of its extents are located in the vulnerable capacity 410. The vibration mitigation system 400 is in risk-mitigation mode, and cluster A 402 is experiencing a vibration event in the form of an earthquake; as such, the vulnerable capacity 410 has been shut down, and a thin mitigation layer has been established in the non-vulnerable capacity 412A, 412B, comprising thin-provisioning volume A 416. Cluster B 404 is physically located 300 miles away from Cluster A and is therefore not experiencing an earthquake; as such, the entire storage capacity of cluster B 404 comprises non-vulnerable capacity 412B. The thin-provisioning volume A 416 was created from data copied from partner volume A 418, which resides within the non-vulnerable capacity 412B on cluster B, and which contained the same data as standard volume A 414 until the risk-initiation mode was activated.

It may be appreciated that FIGS. 2-4 provide only illustrations of individual implementations and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for mitigating vibration damage to a distributed storage system, the method comprising:
   responsive to detecting that a site is at risk of a vibration event:
      classifying drives comprising the distributed storage system located at the site as vulnerable and the drives located at a different site as non-vulnerable drives, wherein the non-vulnerable drives host a plurality of partner volumes comprising copies of a plurality of standard volumes located on the vulnerable drives;
      turning off the vulnerable drives;
      creating, on the non-vulnerable drives, a thin mitigation layer comprising thin-provisioned volumes associated with the standard volumes;
      routing read IO addressed to the standard volumes to the associated partner volumes; and
      routing write IO addressed to the standard volumes to the thin-provisioned volumes;
   responsive to determining that the site is no longer at risk of a vibration event:
      turning on the vulnerable drives; and
      copying one or more states from the thin-provisioned volumes to their associated standard volumes.

2. The method of claim 1, wherein the distributed storage system employs a tiering process, and wherein the method further comprises:
   modifying the tiering process to only migrate data to the non-vulnerable drives.

3. The method of claim 1, further comprising:
   responsive to turning off the vulnerable drives, temporarily activating one or more of the vulnerable drives in a staggered fashion to execute read/write operations during the vibrational event.

4. The method of claim 1, wherein the classifying further comprises classifying at least one of the drives as particularly vulnerable, and wherein the method further comprises:
   preventing one or more highly available volumes from using the at least one particularly vulnerable drive for one or more same backend ranges.

5. The method of claim 1, further comprising:
   responsive to detecting one or more entries in at least one of the thin-provisioned volumes, executing a read IO against the thin-provisioned volume associated with the standard volume to which the read IO was originally addressed.

6. The method of claim 1, wherein the routing is facilitated using an asymmetric logical unit access feature.

7. A computer system for mitigating vibration damage to a distributed storage system, the computer system comprising:

one or more processors, one or more computer readable memories, one or more computer readable storage mediums, and program instructions stored on at least one of the one or more computer readable storage mediums for execution by at least one of the one or more processors via at least one of the one or more memories, wherein the computer system is capable of performing a method comprising:

responsive to detecting that a site is at risk of a vibration event:

classifying drives comprising the distributed storage system located at the site as vulnerable and the drives located at a different site as non-vulnerable drives, wherein the non-vulnerable drives host a plurality of partner volumes comprising copies of a plurality of standard volumes located on the vulnerable drives;

turning off the vulnerable drives;

creating, on the non-vulnerable drives, a thin mitigation layer comprising thin-provisioned volumes associated with the standard volumes;

routing read IO addressed to the standard volumes to the associated partner volumes; and routing write IO addressed to the standard volumes to the thin-provisioned volumes;

responsive to determining that the site is no longer at risk of a vibration event:

turning on the vulnerable drives; and copying one or more states from the thin-provisioned volumes to their associated standard volumes.

8. The computer system of claim 7, wherein the distributed storage system employs a tiering process, and wherein the method further comprises:

modifying the tiering process to only migrate data to the non-vulnerable drives.

9. The computer system of claim 7, further comprising:

responsive to turning off the vulnerable drives, temporarily activating one or more of the vulnerable drives in a staggered fashion to execute read/write operations during the vibrational event.

10. The computer system of claim 7, wherein the classifying further comprises classifying at least one of the drives as particularly vulnerable, and wherein the method further comprises:

preventing one or more highly available volumes from using the at least one particularly vulnerable drive for one or more same backend ranges.

11. The computer system of claim 7, further comprising:

responsive to detecting one or more entries in at least one of the thin-provisioned volumes, executing a read IO against the thin-provisioned volume associated with the standard volume to which the read IO was originally addressed.

12. The computer system of claim 7, wherein the routing is facilitated using an asymmetric logical unit access feature.

13. A computer program product for mitigating vibration damage to a distributed storage system, the computer program product comprising:

one or more computer readable tangible storage medium and program instructions stored on at least one of the one or more tangible storage medium, the program instructions executable by a processor to cause the processor to perform a method comprising:

responsive to detecting that a site is at risk of a vibration event:

classifying drives comprising the distributed storage system located at the site as vulnerable and the drives located at a different site as non-vulnerable drives, wherein the non-vulnerable drives host a plurality of partner volumes comprising copies of a plurality of standard volumes located on the vulnerable drives;

turning off the vulnerable drives;

creating, on the non-vulnerable drives, a thin mitigation layer comprising thin-provisioned volumes associated with the standard volumes;

routing read IO addressed to the standard volumes to the associated partner volumes; and routing write IO addressed to the standard volumes to the thin-provisioned volumes;

responsive to determining that the site is no longer at risk of a vibration event:

turning on the vulnerable drives; and copying one or more states from the thin-provisioned volumes to their associated standard volumes.

14. The computer program product of claim 13, wherein the distributed storage system employs a tiering process, and wherein the method further comprises:

modifying the tiering process to only migrate data to the non-vulnerable drives.

15. The computer program product of claim 13, further comprising:

responsive to turning off the vulnerable drives, temporarily activating one or more of the vulnerable drives in a staggered fashion to execute read/write operations during the vibrational event.

16. The computer program product of claim 13, wherein the classifying further comprises classifying at least one of the drives as particularly vulnerable, and wherein the method further comprises:

preventing one or more highly available volumes from using the at least one particularly vulnerable drive for one or more same backend ranges.

17. The computer program product of claim 13, further comprising:

responsive to detecting one or more entries in at least one of the thin-provisioned volumes, executing a read IO against the thin-provisioned volume associated with the standard volume to which the read IO was originally addressed.

\* \* \* \* \*